(12) United States Patent
Hayashi et al.

(10) Patent No.: US 8,958,677 B2
(45) Date of Patent: Feb. 17, 2015

(54) POLARIZATION-MAINTAINING OPTICAL FIBER

(71) Applicant: Fujikura Ltd., Koto-ku, Tokyo (JP)

(72) Inventors: Kazuyuki Hayashi, Sakura (JP); Katsuaki Izoe, Sakura (JP); Yutaka Endoh, Sakura (JP); Kazuhiko Aikawa, Sakura (JP); Manabu Kudoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/856,117

(22) Filed: Apr. 3, 2013

(65) Prior Publication Data

US 2013/0308914 A1   Nov. 21, 2013

Related U.S. Application Data

(63) Continuation of application No. PCT/JP2011/072787, filed on Oct. 3, 2011.

(30) Foreign Application Priority Data

Oct. 5, 2010   (JP) ................................. 2010-225797

(51) Int. Cl.
*G02B 6/02* (2006.01)
*G02B 6/024* (2006.01)

(52) U.S. Cl.
CPC ...................................... *G02B 6/024* (2013.01)
USPC .......................................... 385/127; 385/126

(58) Field of Classification Search
USPC ................................................. 385/126, 127
See application file for complete search history.

(56) References Cited

U.S. PATENT DOCUMENTS

| 7,412,142 B2* | 8/2008 | Chen et al. ..................... 385/123 |
| 7,430,353 B2* | 9/2008 | Aikawa et al. ................ 385/123 |
| 2009/0080843 A1* | 3/2009 | Bookbinder et al. ......... 385/123 |

FOREIGN PATENT DOCUMENTS

| JP | 63-189809 A | 8/1988 | |
| JP | 63189809 A * | 8/1988 | .................... 385/127 |
| JP | 2003-337238 A | 11/2003 | |
| JP | 2005-055795 A | 3/2005 | |
| JP | 2008-76655 A | 4/2008 | |

OTHER PUBLICATIONS

Kuniharu Himeno et al., "Polarization-maintaining Optical Fibers", Fujikura Technical Report No. 85, 1993, pp. 1-9.

(Continued)

*Primary Examiner* — Jerry Blevins

(74) *Attorney, Agent, or Firm* — Sughrue Mion, PLLC

(57) ABSTRACT

A polarization-maintaining optical fiber of the present invention includes a core, a pair of stress-applying parts provided on both sides of the core, and a cladding surrounding the core and the stress-applying parts, and is used in a wavelength range of 400 to 680 nm. The diameter of the cladding is 125 μm, the diameter of the stress-applying part is 33 to 37 μm, a distance between the pair of stress-applying parts is 8.6 to 15.4 μm, a relative refractive index difference between the core and the cladding is 0.35 to 0.45%, and a cut-off wavelength is less than or equal to 400 nm.

6 Claims, 2 Drawing Sheets

(56) References Cited

OTHER PUBLICATIONS

Fujikura PANDA fiber products and Basics of PM fibers, 88 pgs. URL:http://www.fujikura.co.jp/products/tele/o_device/data/16pnb04j.pdf.

International Search Report for PCT/JP2011/072787 dated Nov. 15, 2011.
Notice of Allowance issued by Japanese Patent Office in Japanese Application No. 2012-537703 dated Oct. 8, 2013.

* cited by examiner

US 8,958,677 B2

POLARIZATION-MAINTAINING OPTICAL FIBER

CROSS REFERENCE TO RELATED APPLICATIONS

This application is a continuation application based on a PCT Patent Application No. PCT/JP2011/072787, filed Oct. 3, 2011, whose priority is claimed on Japanese Patent Application No. 2010-225797, filed Oct. 5, 2010, the entire content of which are hereby incorporated by reference.

BACKGROUND OF THE INVENTION

1. Field of the Invention

The present invention relates to a polarization-maintaining optical fiber suitable for an optical transmission system using a laser diode or the like mainly used in the visible wavelength range, and in particular, a polarization-maintaining optical fiber which can be used in the entire wavelength range of 400 to 680 nm and has reduced bending polarization crosstalk and bending loss in the entire wavelength range.

2. Description of the Related Art

Polarization-maintaining optical fiber is a single-mode optical waveguide (single-mode fiber) capable of holding and transmitting a linearly polarized wave.

The polarization-maintaining optical fiber has a schematic configuration including a core, a pair of stress-applying parts provided on both sides of the core, and a cladding surrounding the core and the stress-applying parts.

The stress-applying parts serve to induce birefringence in the core to which light is guided and are a pair of glass regions that are disposed in the cladding so as to be separated from each other with the core interposed therebetween and face each other in the diameter direction of the polarization-maintaining optical fiber.

In addition, the stress-applying part is provided over the entire length in the longitudinal direction of the polarization-maintaining optical fiber.

The thermal expansion coefficient of the glass regions which form the stress-applying parts is different from the thermal expansion coefficient of glass which forms the cladding.

In addition, a polarization-maintaining optical fiber is known in which the dimension (diameter) of a cross section perpendicular to the longitudinal direction in at least one of the glass regions that form stress-applying parts is larger than the diameter of the core.

The polarization-maintaining optical fiber having such a structure is called PANDA (Polarization-maintaining and absorption reducing) type polarization-maintaining optical fiber.

The polarization-maintaining optical fiber is used not only for optical communication but also for connection between optical components having a polarization dependence or optical components for optical transmission, such as an optical fiber grating or an optical fiber coupler.

Taking into consideration the ease of manufacturing, stability of quality, connectivity with a common silica-based optical waveguide fiber, and the like, the polarization-maintaining optical fiber used as an optical component for optical transmission is designed so as to have a single-mode optical waveguide structure in a narrow wavelength range near the wavelength of the light used (for example, refer to Japanese Unexamined Patent Application, First Publication No. 2003-337238, Japanese Unexamined Patent Application, First Publication No. 2008-76655, Fujikura Technology Vol. 85, p. 1-9, issued October, 1993, and Introduction of Fujikura PANDA fiber and Basis of polarization-maintaining fiber (URL:http://www.fujikura.co.jp/products/tele/o_device/data/16pnb04j.pdf)).

Conventional polarization-maintaining optical fibers have been designed so as to have a single-mode optical waveguide structure in a narrow wavelength range near the wavelength used taking into consideration the ease of manufacturing, stability of quality, connectivity with a common silica-based optical waveguide fiber, and the like.

That is, an optical fiber structure which is satisfactory in terms of bending loss and bending polarization crosstalk in the entire wavelength range of 400 to 680 nm is not yet available.

For example, when a conventional polarization-maintaining optical fiber for 400 nm is used at a wavelength (for example, 680 nm) away from the cut-off wavelength to the longer wavelength, if this polarization-maintaining optical fiber is wound 10 times with a small bending diameter (for example, with a diameter of 60 mm), there has been a problem in that the loss or the polarization crosstalk increases.

In addition, in the conventional polarization-maintaining optical fiber, the diameter of the stress-applying part is increased or the distance between the stress-applying parts is decreased so that polarization crosstalk is not increased when the bending diameter is reduced. However, if the diameter is too large, the rate of non-circularity of the cladding is increased.

Then, when the polarization-maintaining optical fiber is connected with a connector or when the polarization-maintaining optical fiber is connected with other optical fibers or optical components, positioning becomes difficult. As a result, there has been a problem in that working efficiency becomes poor.

If the distance between the stress-applying parts is narrowed, a mode field becomes non-circular. As a result, loss of connection with other optical fibers is increased, or the loss of the optical fiber itself is increased due to the influence of the stress-applying parts.

The present invention has been made in view of the above-described situation, and it is an object of the present invention to provide a polarization-maintaining optical fiber capable of suppressing an increase of bending loss and polarization crosstalk.

SUMMARY

A polarization-maintaining optical fiber of the present invention is a polarization-maintaining optical fiber which includes a core, a pair of stress-applying parts provided on both sides of the core, and a cladding surrounding the core and the stress-applying parts and which is used in a wavelength range of 400 to 680 nm. The diameter of the cladding is 125 µm, the diameter of the stress-applying part is 33 to 37 µm, a distance between the pair of stress-applying parts is 8.6 to 15.4 µm, a relative refractive index difference between the core and the cladding is 0.35 to 0.45%, and a cut-off wavelength is less than or equal to 400 nm.

Preferably, the cladding includes a first cladding formed of fluorine-doped silica glass and a second cladding which is provided on an outer periphery of the first cladding and is formed of pure silica glass.

Preferably, after applying a bending of 60 mm in diameter 10 times, a loss increase in the wavelength range of 400 to 680 nm is less than or equal to 0.1 dB and polarization crosstalk in the wavelength range of 400 to 680 nm is less than or equal to −30 dB.

According to the aspect of the polarization-maintaining optical fiber of the present embodiment, after applying a bending of 60 mm in diameter 10 times, a loss increase in the wavelength range of 400 to 680 nm can be less than or equal to 0.1 dB and polarization crosstalk in the wavelength range of 400 to 680 nm can be less than or equal to −30 dB.

DETAILED DESCRIPTION OF THE PREFERRED EMBODIMENTS

Hereinafter, embodiments of a polarization-maintaining optical fiber of the present invention will be described.

In addition, the present embodiment is intended to explain the summary of the invention in detail for better understanding, and does not limit the present invention unless otherwise specified.

(1) First Embodiment

Figure 1:
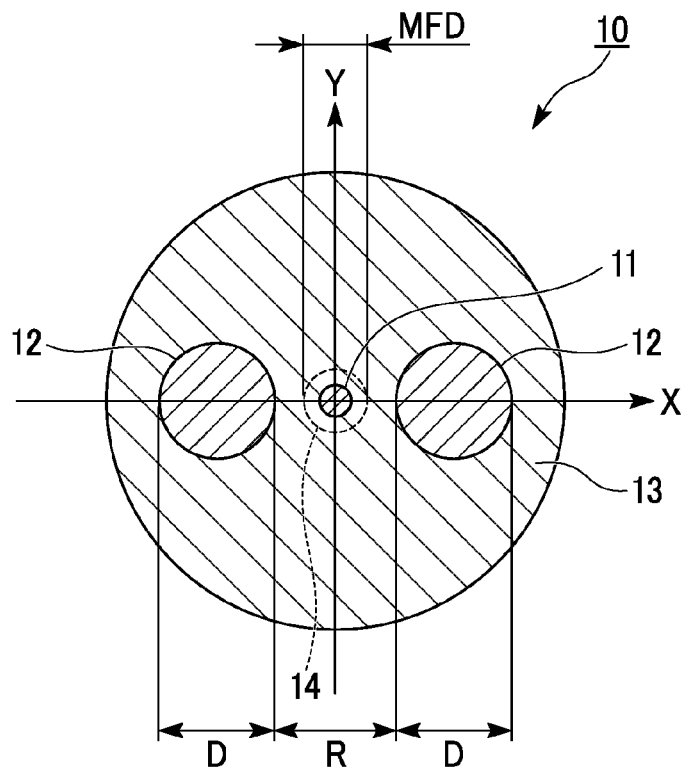
FIG. 1 is a schematic cross-sectional diagram showing a first embodiment of a polarization-maintaining optical fiber of the present invention.

FIG. 1 is a schematic cross-sectional diagram showing a first embodiment of the polarization-maintaining optical fiber of the present invention.

A polarization-maintaining optical fiber 10 of the present embodiment has a schematic configuration including a core 11, a pair of stress-applying parts 12 provided on both sides of the core 11 and at point-symmetrical positions with respect to the core 11, and a cladding 13 surrounding the core 11 and the stress-applying parts 12.

This polarization-maintaining optical fiber 10 is an optical fiber of which a cross-sectional shape perpendicular to the longitudinal direction, that is, a cross-sectional shape in the diameter direction is circular. A material with higher refractive index than the cladding 13 is used as the core 11, and a material with a larger thermal expansion coefficient than the cladding 13 is used as the stress-applying part 12.

As these materials, any material may be used as long as it is a material used for the conventional PANDA type polarization-maintaining optical fiber.

For example, silica glass added (doped) with germanium is used as a material of the core 11.

As a material of the stress-applying part 12, $B_2O_3$—$SiO_2$ glass obtained by adding (doping) boron of about 17 to 21 mol % in cross-sectional weight concentration of boron oxide ($B_2O_3$) is used.

Pure silica glass is used as a material of the cladding 13.

The refractive index of the core 11 is 1.462 to 1.464.

In addition, the thermal expansion coefficient of the core 11 is $21\times10^{-7}$/° C. to $22\times10^{-7}$/° C.

The thermal expansion coefficient of the stress-applying part 12 is $14\times10^{-7}$/° C. to $15\times10^{-7}$/° C.

The refractive index of the cladding 13 is 1.456 to 1.458.

In addition, the thermal expansion coefficient of the cladding 13 is $4\times10^{-7}$/° C. to $6\times10^{-7}$/° C.

The relative refractive index difference between the core 11 and the cladding 13 is 0.35 to 0.45%, and is preferably 0.37 to 0.43%.

By setting the relative refractive index difference within the above range, the effect of confinement of light to the core 11 becomes strong. Accordingly, even if the polarization-maintaining optical fiber 10 is bent with a small bending diameter, the loss does not increase.

When the relative refractive index difference is less than 0.35%, the effect of confinement of light to the core 11 becomes weak. Accordingly, if the polarization-maintaining optical fiber 10 is bent with a small bending diameter, the loss increases.

As the relative refractive index difference becomes larger, the effect of confinement of light to the core 11 becomes stronger. Accordingly, even if the polarization-maintaining optical fiber 10 is bent with a small bending diameter, the loss does not increase.

However, if the relative refractive index difference exceeds 0.45%, a mode field diameter (MFD) is reduced. As a result, connectivity with other optical fibers or optical components is reduced.

The core 11 forms the center of the polarization-maintaining optical fiber 10, and the cross-sectional shape of the polarization-maintaining optical fiber 10 in the diameter direction is circular.

Preferably, the diameter of the core 11 is 1.5 to 3.5 μm. More preferably, the diameter of the core 11 is 2 μm to 3 μm.

When the diameter of the core 11 is less than 2 μm, it is necessary to increase the refractive index difference between the core 11 and the cladding 13. In this case, since the MFD is also reduced, connection with other optical fibers, incidence of light from other optical components, and the like become difficult.

On the other hand, if the diameter of the core 11 exceeds 3 μm, it is necessary to reduce the refractive index difference between the core 11 and the cladding 13. Accordingly, loss due to the bending of the polarization-maintaining optical fiber 10 is increased.

The diameter of the cladding 13 is 125 μm.

The stress-applying parts 12 are disposed so as to be separated from each other with the core 11 interposed therebetween, and the cross-sectional shape of the polarization-maintaining optical fiber 10 in the diameter direction is circular.

The diameter D of the stress-applying part 12 is 33 to 37 μm, and is preferably 34 μm to 36 μm.

When the diameter D of the stress-applying part 12 is less than 33 μm, stress applied to the core 11 is reduced. As a result, the polarization crosstalk characteristic is degraded.

On the other hand, if the diameter D of the stress-applying part 12 exceeds 37 μm, the cladding 13 becomes non-circular. As a result, workability for a connector is degraded.

In addition, a distance R between the two stress-applying parts 12 is 8.6 to 15.4 μm, and is preferably 10 to 14 μm.

When the distance R between the stress-applying parts 12 is less than 8.6 μm, a distance between the stress-applying part 12 and the core 11 is too small. In this case, there is a possibility that the mode field will become non-circular and the connection loss will increase accordingly. Therefore, this is not desirable.

In addition, if the stress-applying part 12 overlaps the mode field, the loss is increased.

On the other hand, if the distance R between the stress-applying parts 12 exceeds 15.4 μm, the polarization maintaining characteristic is degraded. Therefore, this is not desirable.

Hereinafter, the reason why the above-described structural parameters of the polarization-maintaining optical fiber of the present invention are set to be within the above-described ranges will be described.

By calculating the diameter of the stress-applying part 12 and the distance between the stress-applying parts 12 using the method proposed in Japanese Unexamined Patent Application, First Publication No. 2003-337238 described above, the modal birefringence which determines the characteristics of the optimal polarization crosstalk can be calculated without increasing the rate of non-circularity of the core 11.

In addition, the diameter of the stress-applying part determined by this method was 38.75 μm.

Here, when a polarization-maintaining optical fiber was manufactured in which the diameter of the stress-applying part was 38.75 μm and other structural parameters were within the above-described ranges, the rate of non-circularity of the cladding exceeded the specification (2% or less).

Therefore, when the inventors and the like manufactured a polarization-maintaining optical fiber by changing the diameter of the stress-applying part, they found out that optimal polarization crosstalk characteristics were obtained and the rate of non-circularity of the cladding satisfied the specification if the diameter of the stress-applying part was in a range of 33 to 37 μm.

In addition, since the polarization-maintaining optical fiber 10 can be used in the entire wavelength range of 400 to 680 nm, the cut-off wavelength is less than or equal to 400 nm.

According to the polarization-maintaining optical fiber 10 of the present embodiment, after applying a bending of 60 mm in diameter 10 times, a loss increase in the wavelength range of 400 to 680 nm becomes less than or equal to 0.1 dB and polarization crosstalk in the wavelength range of 400 to 680 nm becomes less than or equal to −30 dB.

Therefore, by using the polarization-maintaining optical fiber 10 as an optical fiber for connection that is used for optical components for optical transmission, such as an optical fiber amplifier, a semiconductor laser, and a modulator, and optical measurement equipment, one type of optical fiber is required for each wavelength although about three types of optical fibers were required for each wavelength in the related art.

(2) Second Embodiment

Figure 2:
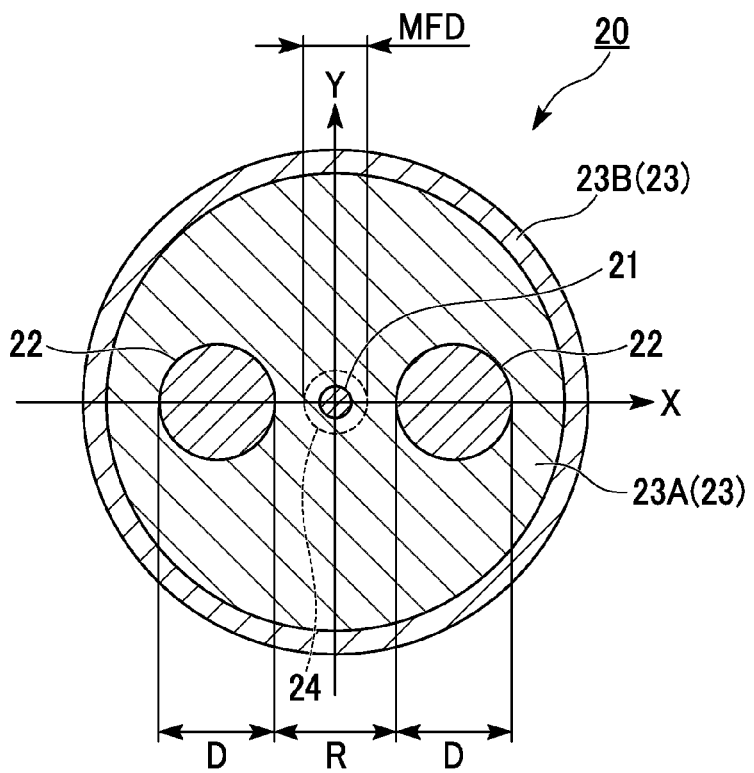
FIG. 2 is a schematic cross-sectional diagram showing a second embodiment of the polarization-maintaining optical fiber of the present invention.

FIG. 2 is a schematic cross-sectional diagram showing a second embodiment of the polarization-maintaining optical fiber of the present invention.

A polarization-maintaining optical fiber 20 of the present embodiment has a schematic configuration including a core 21, a pair of stress-applying parts 22 provided on both sides of the core 21 and at point-symmetrical positions with respect to the core 21, and a cladding 23 surrounding the core 21 and the stress-applying parts 22.

In addition, the cladding 23 is configured to include a first cladding 23A, which directly surrounds the core 21 and the stress-applying parts 22, and a second cladding 23B provided on the outer periphery of the first cladding 23A.

This polarization-maintaining optical fiber 20 is an optical fiber of which a cross-sectional shape perpendicular to the longitudinal direction, that is, a cross-sectional shape in the diameter direction is circular.

A material with higher refractive index than the cladding 23 is used as the core 21, and a material with a larger thermal expansion coefficient than the cladding 23 is used as the stress-applying part 22.

As these materials, any material may be used as long as it is a material used for the conventional PANDA type polarization-maintaining optical fiber.

For example, pure silica glass is used as a material of the cladding 21.

As a material of the stress-applying part 22, $B_2O_3$—$SiO_2$ glass obtained by adding (doping) boron of about 17 to 21 mol % in cross-sectional weight concentration of boron oxide ($B_2O_3$) is used.

Fluorine-doped silica glass is used as a material of the first cladding 23A, and pure silica glass is used as a material of the second cladding 23B.

The refractive index of the core 21 is 1.456 to 1.458.

In addition, the thermal expansion coefficient of the core 21 is $4 \times 10^{-7}$/° C. to $6 \times 10^{-7}$/° C.

The thermal expansion coefficient of the stress-applying part 22 is $14 \times 10^{-7}$/° C. to $15 \times 10^{-7}$/° C.

The refractive index of the first cladding 23A is 1.450 to 1.452.

In addition, the thermal expansion coefficient of the first cladding 23A is $4 \times 10^{-7}$/° C. to $6 \times 10^{-7}$/° C.

The refractive index of the second cladding 23B is 1.456 to 1.458.

In addition, the thermal expansion coefficient of the second cladding 23B is $4 \times 10^{-7}$/° C. to $6 \times 10^{-7}$/° C.

The relative refractive index difference between the core 21 and the cladding 23 is 0.35 to 0.45%, and is preferably 0.37 to 0.43%.

By setting the relative refractive index difference within the above range, the effect of confinement of light to the core 21 becomes strong. Accordingly, even if the polarization-maintaining optical fiber 20 is bent with a small bending diameter at a wavelength away from the cut-off wavelength to the longer wavelength, the loss does not increase.

When the relative refractive index difference is less than 0.35%, the effect of confinement of light to the core 21 becomes weak. Accordingly, if the polarization-maintaining optical fiber 20 is bent with a small bending diameter, the loss increases.

As the relative refractive index difference becomes larger, the effect of confinement of light to the core 21 becomes stronger. Accordingly, even if the polarization-maintaining optical fiber 20 is bent with a small bending diameter, the loss does not increase.

However, if the relative refractive index difference exceeds 0.45%, the mode field diameter (MFD) is reduced. As a result, connectivity with other optical fibers or optical components is reduced.

The core 21 forms the center of the polarization-maintaining optical fiber 20, and the cross-sectional shape of the polarization-maintaining optical fiber 20 in the diameter direction is circular.

Preferably, the diameter of the core 21 is 1.5 to 3.5 μm. More preferably, the diameter of the core 21 is 2 to 3 μm.

When the diameter of the core 21 is less than 2 μm, it is necessary to increase the refractive index difference between the core 21 and the cladding 23. In this case, since the MFD is also reduced, connection with other optical fibers, incidence of light using a lens, and the like become difficult.

On the other hand, if the diameter of the core 21 exceeds 3 it is necessary to reduce the refractive index difference between the core 21 and the cladding 213. Accordingly, loss due to the bending of the polarization-maintaining optical fiber 20 is increased.

Preferably, the diameter of the first cladding 23A is 30 to 95 μm. More preferably, the diameter of the first cladding 23A is 60 to 90 μm.

The diameter of the second cladding 23B is 125 μm.

In addition, preferably, the thickness of the second cladding 23B is 15 to 32.5 μm. More preferably, the thickness of the second cladding 23B is 17.5 μm to 32.5 μm.

The reason why the second cladding 23B is provided is that the melting point of the cladding 23 is low if the core 21 is pure silica glass and the cladding 23 is fluorine-doped silica glass and tension is applied to the core 21 at the time of drawing, and as a result, the optical properties are no longer stable.

The reason why the thickness of the first cladding 23A is greater than or equal to 30 μm is that the light propagating through the core 21 leaks to the second cladding 23B if the second cladding 23B having the same refractive index as the core 21 is close to the core 21.

In addition, if the thickness of the second cladding 23B is less than or equal to 15 μm, tension applied to the core 21 is increased. As a result, the optical properties are no longer stable.

The stress-applying parts 22 are disposed so as to be separated from each other with the core 21 interposed therebetween, and the cross-sectional shape of the polarization-maintaining optical fiber 20 in the diameter direction is circular.

The diameter D of the stress-applying part 22 is 33 to 37 μm, and is preferably 34 to 36 μm.

When the diameter D of the stress-applying part 22 is less than 33 μm, stress applied to the core 21 is reduced. As a result, the polarization crosstalk characteristic is degraded.

On the other hand, if the diameter D of the stress-applying part 22 exceeds 37 μm, the cladding 23 becomes non-circular. As a result, workability for a connector is degraded.

In addition, a distance R between the two stress-applying parts 22 is 8.6 to 15.4 μm, and is preferably 10 to 14 μm.

When the distance R between the stress-applying parts 22 is less than 8.6 μm, a distance between the stress-applying part 22 and the core 21 is too small. In this case, there is a possibility that the mode field will become non-circular and the connection loss will increase accordingly. Therefore, this is not desirable.

On the other hand, if the distance R between the stress-applying parts 22 exceeds 15.4 the polarization maintaining characteristic is degraded. Therefore, this is not desirable.

In addition, since the polarization-maintaining optical fiber 20 can be used in the entire wavelength range of 400 to 680 nm, the cut-off wavelength is less than or equal to 400 nm.

According to the polarization-maintaining optical fiber 20 of the present embodiment, after applying a bending of 60 mm in diameter 10 times, a loss increase in the wavelength range of 400 to 680 nm becomes less than or equal to 0.1 dB and polarization crosstalk in the wavelength range of 400 to 680 nm becomes less than or equal to −30 dB.

Therefore, by using the polarization-maintaining optical fiber 20 as an optical fiber for connection that is used for optical components for optical transmission, such as an optical fiber amplifier, a semiconductor laser, and a modulator, and optical measurement equipment, one type of optical fiber is required for each wavelength although about three types of optical fibers were required for each wavelength in the related art.

EXAMPLES

Hereinafter, the present invention will be described more specifically through examples and comparative examples. However, the present invention is not limited to the following examples.

First to Third Examples

In manufacturing of a polarization-maintaining optical fiber, a core rod as a core region formed of pure silica glass was prepared first.

Then, particles of pure silica glass were deposited on the outer periphery of the core rod in order to obtain a predetermined cut-off wavelength. Then, this deposition member was sintered in an atmosphere of a predetermined concentration of fluorine gas so that the relative refractive index difference Δ of 0.35% (second example), 0.40% (first example), and 0.45% (third embodiment) was obtained.

Then, particles of silica glass were deposited on the outer periphery of the sintered body and were then sintered so as to become pure silica glass. As a result, a core cladding preform of PANDA type polarization-maintaining optical fiber was obtained.

Then, a drilled preform was manufactured by drilling a hole at predetermined positions on both sides of the core region of the core cladding preform so as to have a predetermined diameter using an ultrasonic drill and making the mirror surface by grinding and polishing the inner surface of the hole.

Apart from this, using an modified chemical vapor deposition method, a stress-applying member as a stress-applying part was obtained by depositing silica glass, which was obtained by adding boron (B) of about 21 mol % in cross-sectional weight concentration of boron oxide ($B_2O_3$), on the inside of the silica glass tube.

Then, a stress-applying member as a stress-applying part of the polarization-maintaining optical fiber was obtained by grinding and removing the silica tube of the outer periphery of the original preform and then polishing the outer surface until the outer surface becomes a mirror surface.

The diameter of the stress-applying member is smaller than the diameter of the hole of the drilled preform.

This stress-applying member was inserted into the drilled preform, and was heated in the drawing furnace to perform drawing so that the diameter of the cladding becomes 125 μm.

On the optical fiber after drawing, two-layered ultraviolet curable acrylate resin was coated. As a result, polarization-maintaining optical fibers of the first to third examples were obtained.

In this case, the coating diameter of the first layer was set to about 185 μm, and the coating diameter of the second layer was set to about 250 μm.

For the polarization-maintaining optical fibers of the first to third examples obtained as described above, transmission loss, bending loss, and polarization crosstalk and bending polarization crosstalk when the polarization-maintaining optical fibers were wound around a bobbin having a diameter of 160 mm were evaluated.

In addition, the connectivity was evaluated by fusion splice using the external diameter alignment of the optical fibers.

These results are shown in Table 1 together with structural parameters of the polarization-maintaining optical fibers.

TABLE 1

|  | First example | Second example | Third example |
| --- | --- | --- | --- |
| Relative refractive index difference (%) | 0.40 | 0.35 | 0.45 |
| Core diameter (μm) | 2.6 | 2.5 | 2.2 |
| Diameter of stress-applying part (μm) | 35 | 35 | 35 |
| Distance between stress-applying parts (μm) | 11 | 11 | 11 |
| Cladding diameter (μm) | 125 | 125 | 125 |
| Coating diameter (μm) | 250 | 250 | 250 |

TABLE 1-continued

|  | First example | Second example | Third example |
|---|---|---|---|
| MFD [405 nm] (μm) | 2.3 | 2.7 | 2.4 |
| Bead length [405 nm] (mm) | 0.69 | 0.7 | 0.65 |
| Modal birefringence (×10$^{-4}$) | 0.59 | 0.58 | 0.62 |
| Cut-off wavelength (nm) | 390 | 390 | 390 |
| Loss [400 nm] (dB/km) | 38 | 38 | 38 |
| Bending loss [680 nm] (dB/f60 mm 10 times) | 0.005 | 0.005 | 0.005 |
| Polarization crosstalk [680 nm] (dB) | −42 | −42 | −42 |
| Bending Polarization crosstalk [680 nm] (dB/f60 mm 10 times) | −42 | −42 | −42 |
| Connection characteristic | good | good | good |

From the result of Table 1, in the polarization-maintaining optical fibers of the first to third examples, the cut-off wavelength measured at 2 m in length was 390 nm.

In addition, when the polarization-maintaining optical fibers of the first to third examples were wound 10 times around a bobbin having a diameter of 60 mm, the loss and polarization crosstalk at the wavelength of 680 nm were 0.005 dB and −42 dB, respectively. Accordingly, a satisfactory result was obtained.

In addition, the polarization-maintaining optical fiber of the first example was wound around bobbins having different diameters, and the bending loss and polarization crosstalk in the wavelength range of 400 to 680 nm were evaluated for each bending diameter.

Figure 3:
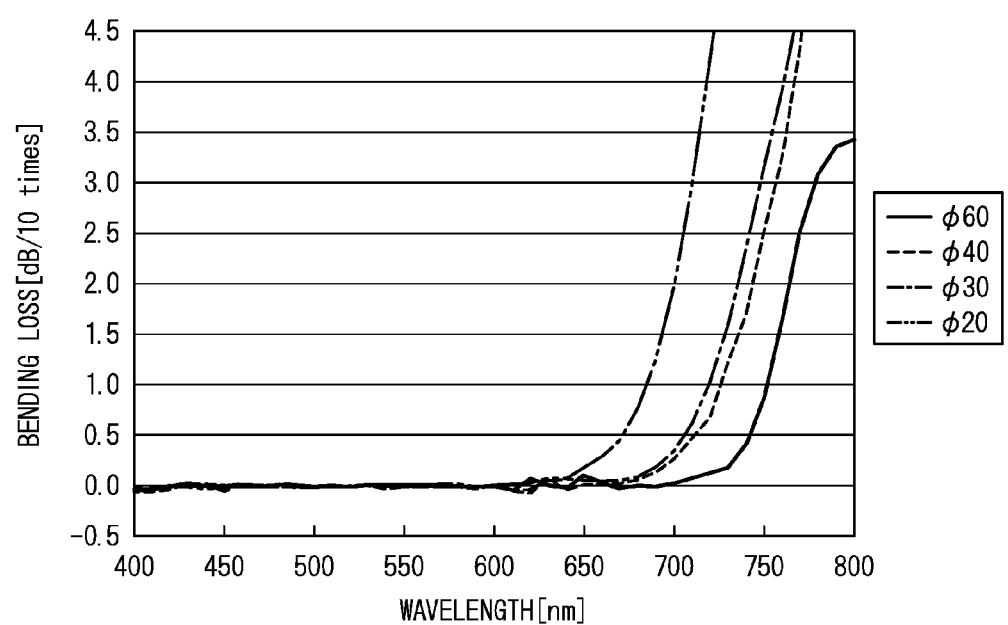
FIG. 3 is a graph showing a result when a polarization-maintaining optical fiber of a first example of the present invention is wound around bobbins having different external diameters and the bending loss in the wavelength range of 400 to 680 nm is measured for each bending diameter.

The result is shown in Table 2 and FIG. 3.

TABLE 2

Unit: dB

| Bending diameter | wavelength | | | |
|---|---|---|---|---|
|  | 406 nm | 480 nm | 633 nm | 676 nm |
| φ 280 mm | −44.01 | −44.65 | −45.12 | −43.85 |
| φ 60 mm | −42.65 | −43.80 | −45.84 | −41.77 |
| φ 40 mm | −43.08 | −43.48 | −44.53 | −44.08 |
| φ 30 mm | −44.73 | −43.44 | −46.09 | −43.35 |
| φ 20 mm | −41.07 | −41.01 | −42.72 | −43.18 |

The number of windings: 10 times

From the result of Table 2, when the bending diameter was 20 to 60 mm, the polarization crosstalk in the wavelength range of 400 to 680 nm was less than or equal to −41 dB.

From the result shown in FIG. 3, when the bending diameter was 20 to 60 mm, the bending loss in the wavelength range of 400 to 680 nm was less than or equal to 0.1 dB.

First Comparative Example

A polarization-maintaining optical fiber of a first comparative example was obtained in the same conditions as in the first embodiment except that the relative refractive index difference Δ was set to 0.23%.

For the polarization-maintaining optical fiber of the first comparative example obtained as described above, transmission loss, bending loss, and polarization crosstalk and bending polarization crosstalk when the polarization-maintaining optical fiber was wound around a bobbin having a diameter of 160 mm were evaluated.

In addition, connectivity was evaluated.

These results are shown in Table 3 together with structural parameters of each polarization-maintaining optical fiber.

TABLE 3

|  | First comparative example | Second comparative example | Third comparative example |
|---|---|---|---|
| Relative refractive index difference (%) | 0.23 | 0.6 | 0.4 |
| Core diameter (μm) | 3 | 1.9 | 2.3 |
| Diameter of stress-applying part (μm) | 35 | 35 | 38.75 |
| Distance between stress-applying parts (μm) | 15.4 | 11 | 11 |
| Cladding diameter (μm) | 125 | 125 | 125 |
| Coating diameter (μm) | 250 | 250 | 250 |
| MFD [405 nm] (μm) | 3.3 | 2.07 | 2.6 |
| Bead length [405 nm] (mm) | 0.75 | 0.58 | 0.68 |
| Modal birefringence (×10$^{-4}$) | 0.54 | 0.7 | 0.59 |
| Cut-off wavelength (nm) | 370 | 390 | 390 |
| Loss [400 nm] (dB/km) | 32 | 46 | 38 |
| Bending loss [680 nm] (dB/φ 60 mm 10 times) | 7 | 0.001 | 0.005 |
| Polarization crosstalk [680 nm] (dB) | −35 | −42 | −42 |
| Bending Polarization crosstalk [680 nm] (dB/φ 60 mm 10 times) | Immeasurable | −42 | −42 |
| Connection characteristic | good | bad | good |
| Non-circularity of cladding | good | good | bad |

From the result of Table 3, in the polarization-maintaining optical fiber of the first comparative example, the cut-off wavelength measured at 2 m in length was 370 nm.

In addition, when the polarization-maintaining optical fiber of the first comparative example was wound 10 times around a bobbin having a diameter of 60 mm, the loss at the wavelength of 680 nm was 7 dB and the polarization crosstalk was poor and immeasurable.

Second Comparative Example

A polarization-maintaining optical fiber of a second comparative example was obtained in the same conditions as in the first embodiment except that the relative refractive index difference Δ was set to 0.60%.

For the polarization-maintaining optical fiber of the second comparative example obtained as described above, transmission loss, bending loss, and polarization crosstalk and bending polarization crosstalk when the polarization-maintaining optical fiber was wound around a bobbin having a diameter of 160 mm were evaluated.

In addition, connectivity was evaluated.

These results are shown in Table 3 together with structural parameters of each polarization-maintaining optical fiber.

From the result of Table 3, in the polarization-maintaining optical fiber of the second comparative example, the cut-off wavelength measured at 2 m in length was 390 nm.

In addition, when the polarization-maintaining optical fiber of the second comparative example was wound 10 times around a bobbin having a diameter of 60 mm, the loss and polarization crosstalk at the wavelength of 680 nm were 0.005 dB and −42 dB, respectively. Accordingly, a satisfactory result was obtained.

However, since the diameter of the mode field diameter (MFD) is small, loss of connection with other optical fibers is increased if the axis deviation is large.

Third Comparative Example

A polarization-maintaining optical fiber of a third comparative example was obtained in the same conditions as in the first embodiment except that the relative refractive index difference Δ was set to 0.40%.

For the polarization-maintaining optical fiber of the third comparative example obtained as described above, transmission loss, bending loss, and polarization crosstalk and bending polarization crosstalk when the polarization-maintaining optical fiber was wound around a bobbin having a diameter of 160 mm were evaluated.

In addition, connectivity was evaluated.

These results are shown in Table 3 together with structural parameters of each polarization-maintaining optical fiber.

From the result of Table 3, in the polarization-maintaining optical fiber of the third comparative example, the cut-off wavelength measured at 2 m in length was 390 nm.

In addition, when the polarization-maintaining optical fiber of the third comparative example was wound 10 times around a bobbin having a diameter of 60 mm, the loss and polarization crosstalk at the wavelength of 680 nm were 0.005 dB and −42 dB, respectively. Accordingly, a satisfactory result was obtained.

However, although the diameter of the stress-applying part was 38.75 μm and other structural parameters were almost equal to those in the first example, the modal birefringence was the same as that in the first example and the rate of non-circularity of the cladding was large.

According to the polarization-maintaining optical fiber of the present invention, it is possible to suppress an increase of bending loss and polarization crosstalk.

What is claimed is:

1. A polarization-maintaining optical fiber for use in a wavelength range of 400 to 680 nm, comprising:
    a core;
    a pair of stress-applying parts provided on both sides of the core; and
    a cladding surrounding the core and the stress-applying parts, wherein
    a diameter of the cladding is 125 μm, a diameter of each of the stress-applying parts is 33 to 37 μm, a distance between the pair of stress-applying parts is 8.6 to 15.4 μm, a relative refractive index difference between the core and the cladding is 0.35 to 0.45%, and a cut-off wavelength is less than or equal to 400 nm,
    wherein thermal expansion coefficient of the core is in a range between $21 \times 10^{-7}/°$ C. and $22 \times 10^{-7}/°$ C. or in a range between $4 \times 10^{-7}/°$ C. and $6 \times 10^{-7}/°$ C. and
    wherein thermal expansion coefficient of the stress-applying parts is in a range between $14 \times 10^{-7}/°$ C. and $15 \times 10^{-7}/°$ C.

2. The polarization-maintaining optical fiber according to claim 1, wherein
    the cladding comprises a first cladding formed of fluorine-doped silica glass and a second cladding which is provided on an outer periphery of the first cladding and is formed of pure silica glass.

3. The polarization-maintaining optical fiber according to claim 1, wherein
    after applying a bending of 60 mm in diameter 10 times, a loss increase in the wavelength range of 400 to 680 nm is less than or equal to 0.1 dB and polarization crosstalk in the wavelength range of 400 to 680 nm is less than or equal to −30 dB.

4. The polarization-maintaining optical fiber according to claim 2, wherein
    after applying a bending of 60 mm in diameter 10 times, a loss increase in the wavelength range of 400 to 680 nm is less than or equal to 0.1 dB and polarization crosstalk in the wavelength range of 400 to 680 nm is less than or equal to −30 dB.

5. The polarization-maintaining optical fiber according to claim 4, wherein
    the diameter of each of the stress-applying parts is 34 to 36 μm.

6. The polarization-maintaining optical fiber according to claim 4, wherein
    the distance between the pair of stress-applying parts is 8.6 to 14 μm.

* * * * *